United States Patent
Hong et al.

(10) Patent No.: US 11,060,163 B2
(45) Date of Patent: Jul. 13, 2021

(54) METHOD FOR REFINING MAGNETIC DOMAINS OF GRAIN-ORIENTED ELECTRICAL STEEL PLATES, AND APPARATUS THEREFOR

(71) Applicant: POSCO, Pohang-si (KR)

(72) Inventors: Seong Cheol Hong, Pohang-si (KR); Jae Kyoum Kim, Pohang-si (KR); Ki Young Min, Pohang-si (KR); Se Min Park, Pohang-si (KR); Myung Sik Chun, Pohang-si (KR); Gyoo Taek Lee, Pohang-si (KR); Oh Yeoul Kwon, Pohang-si (KR); Hyun Chui Park, Pohang-si (KR)

(73) Assignee: POSCO, Pohang-si (KR)

( * ) Notice: Subject to any disclaimer, the term of this patent is extended or adjusted under 35 U.S.C. 154(b) by 253 days.

(21) Appl. No.: 16/072,143

(22) PCT Filed: Dec. 23, 2016

(86) PCT No.: PCT/KR2016/015161
§ 371 (c)(1),
(2) Date: Jul. 23, 2018

(87) PCT Pub. No.: WO2017/126811
PCT Pub. Date: Jul. 27, 2017

(65) Prior Publication Data
US 2019/0062866 A1    Feb. 28, 2019

(30) Foreign Application Priority Data
Jan. 22, 2016 (KR) .................. 10-2016-0008390

(51) Int. Cl.
*C21D 10/00* (2006.01)
*B23K 26/00* (2014.01)
(Continued)

(52) U.S. Cl.
CPC .......... *C21D 10/00* (2013.01); *B23K 26/0006* (2013.01); *B23K 26/03* (2013.01);
(Continued)

(58) Field of Classification Search
None
See application file for complete search history.

(56) References Cited

U.S. PATENT DOCUMENTS

| 4,203,784 A | 5/1980 | Kuroki et al. |
| 2009/0200280 A1 | 8/2009 | Piantoni et al. |

(Continued)

FOREIGN PATENT DOCUMENTS

| CN | 202007259 U | 10/2011 |
| CN | 202226886 U | 5/2012 |

(Continued)

OTHER PUBLICATIONS

Machine translation of JPH 02-22423. (Year: 1990).*
(Continued)

*Primary Examiner* — Xiaowei Su
(74) *Attorney, Agent, or Firm* — Morgan, Lewis & Bockius LLP

(57) ABSTRACT

Provided is a method for refining magnetic domains of grain-oriented electrical steel plates including: a steel plate supporting roll position adjusting step of controlling a vertical direction position of the steel plate while supporting the steel plate; a laser radiating step of melting the steel plate by radiating a laser beam to form grooves on the surface of the steel plate; and a setting and maintaining step of setting and maintaining an internal operation environment of a laser room in which the laser radiation is performed, so as to increase magnetic domain refinement efficiency and improve workability by optimizing equipment and processes, thereby increasing the processing capacity.

9 Claims, 3 Drawing Sheets

(51) Int. Cl.
| | |
|---|---|
| *B23K 26/08* | (2014.01) |
| *C21D 8/12* | (2006.01) |
| *B23K 26/354* | (2014.01) |
| *B23K 26/12* | (2014.01) |
| *B23K 26/142* | (2014.01) |
| *B23K 26/359* | (2014.01) |
| *B23K 26/364* | (2014.01) |
| *B23K 37/047* | (2006.01) |
| *B23K 26/082* | (2014.01) |
| *B23K 26/04* | (2014.01) |
| *B23K 26/03* | (2006.01) |
| *B23K 26/40* | (2014.01) |
| *B23K 26/70* | (2014.01) |
| *B23K 26/16* | (2006.01) |
| *B23K 101/16* | (2006.01) |
| *B23K 103/04* | (2006.01) |

(52) U.S. Cl.
CPC ........ *B23K 26/048* (2013.01); *B23K 26/0821* (2015.10); *B23K 26/0846* (2013.01); *B23K 26/0876* (2013.01); *B23K 26/123* (2013.01); *B23K 26/127* (2013.01); *B23K 26/142* (2015.10); *B23K 26/16* (2013.01); *B23K 26/354* (2015.10); *B23K 26/359* (2015.10); *B23K 26/364* (2015.10); *B23K 26/40* (2013.01); *B23K 26/706* (2015.10); *B23K 37/047* (2013.01); *C21D 8/12* (2013.01); *C21D 8/1244* (2013.01); *C21D 8/1277* (2013.01); *C21D 8/1294* (2013.01); *B23K 2101/16* (2018.08); *B23K 2103/04* (2018.08); *C21D 2201/05* (2013.01)

(56) References Cited

U.S. PATENT DOCUMENTS

2013/0139932 A1* 6/2013 Sakai ............... C21D 8/1272
148/565

2014/0202213 A1* 7/2014 Park ................. B23K 26/704
65/348
2019/0054570 A1* 2/2019 Hong ................ C21D 8/12

FOREIGN PATENT DOCUMENTS

| | | | |
|---|---|---|---|
| EP | 0870843 | A1 | 10/1998 |
| JP | S57-002252 | B2 | 1/1982 |
| JP | S57-203720 | A | 12/1982 |
| JP | S58-005968 | B2 | 2/1983 |
| JP | S58-026405 | B2 | 6/1983 |
| JP | S61-157631 | A | 7/1986 |
| JP | H02-22423 | A | 1/1990 |
| JP | H05-022547 | A | 3/1993 |
| JP | H05-202450 | A | 8/1993 |
| JP | H05-339634 | A | 12/1993 |
| JP | H06-057857 | B2 | 8/1994 |
| JP | H06-63037 | B2 | 8/1994 |
| JP | H07-072300 | B2 | 8/1995 |
| JP | 2002-361450 | A | 12/2002 |
| JP | 2004-122218 | A | 4/2004 |
| JP | 2012-162757 | A | 8/2012 |
| KR | 20-0204905 | Y1 | 12/2000 |
| KR | 10-2012-0073913 | A | 7/2012 |
| KR | 10-2012-0073914 | A | 7/2012 |
| KR | 10-2013-0074098 | A | 7/2013 |
| KR | 10-2014-0021915 | A | 2/2014 |
| KR | 10-1395800 | B1 | 5/2014 |
| KR | 10-2014-0087126 | A | 7/2014 |
| KR | 10-2014-0094354 | A | 7/2014 |
| KR | 10-2015-0000927 | A | 1/2015 |
| KR | 10-2017-0011860 | A | 2/2017 |

OTHER PUBLICATIONS

Machine translation of KR101385742B1. (Year: 2014).*
European Extended Search Report issued in European Application No. 16886654.9 dated Oct. 17, 2018.
Japanese Office Action dated Aug. 20, 2019 issued in Japanese Patent Application No. 2018-538612.
Written Opinion and International Search Report dated Mar. 28, 2017 issued in International Patent Applicaton No. PCT/KR2016/015161 (with English translation).

* cited by examiner

METHOD FOR REFINING MAGNETIC DOMAINS OF GRAIN-ORIENTED ELECTRICAL STEEL PLATES, AND APPARATUS THEREFOR

CROSS REFERENCE

This patent application is the U.S. National Phase under 35 U.S.C. § 371 of International Application No. PCT/KR2016/015161, filed on Dec. 23, 2016, which claims the benefit of Korean Patent Application No. 10-2016-0008390, filed on Jan. 22, 2016, the entire contents of each are hereby incorporated by reference.

TECHNICAL FIELD

The present invention relates to a method for refining magnetic domains of grain-oriented electrical steel plates and an apparatus thereof, which permanently refine magnetic domains of steel plates by radiating a laser to the grain-oriented electrical steel plates.

BACKGROUND ART

For example, a grain-oriented electrical steel plate with magnetic characteristics such as low iron loss and high magnetic flux density is required in order to reduce power loss and improve efficiency of electric devices such as a transformer.

There is disclosed a technique of refining magnetic domains in a vertical direction to a rolling direction by a mechanical method or radiating a laser beam to a surface of the steel plate so as to reduce the iron loss of the grain-oriented electrical steel plate.

The method for refining the magnetic domains may be broadly divided into temporal magnetic domain refinement and permanent magnetic domain refinement depending on whether or not an effect of improving magnetic domain refinement after the stress removing and annealing is maintained.

The temporal magnetic domain refinement method has a disadvantage of losing the magnetic domain refinement effect after the stress removing and annealing. In the temporal magnetic domain refinement method, the magnetic domains are refined by forming a local compression stress portion on the surface of the steel plate. However, such a method causes damage to an insulating coating layer on the surface of the steel plate and thus, recoating is required, and there is a disadvantage that the manufacturing cost is high because the magnetic domain refinement is performed in an intermediate process rather than a final product.

The permanent magnetic domain refinement method may maintain an effect of improving the iron loss even after heat treatment. For the permanent magnetic domain refinement, techniques using an etching method, a roll method, and a laser method have been mainly used. In the case of the etching method, it is difficult to control groove formation depth and width, and it is difficult to guarantee the iron loss property of the final product, and it is disadvantageous in that the etching method is not eco-friendly because an acid solution is used. In the case of the method using the roll, there is a disadvantage that the stability, reliability, and process are complicated for mechanical processing.

In the method for refining the magnetic domains of the steel plate by using a laser, molten grooves are formed on the surface of the steel plate by radiating a laser beam to the surface of the steel plate while the steel plate is supported and the tension is adjusted, thereby refining magnetic domains. As described above, in order to refine the magnetic domains using the laser, it is required to improve and optimize the process more effectively so that the iron loss of the electric steel plate is reduced and the magnetic flux density is increased while high-speed processing can be performed.

DISCLOSURE

Technical Problem

The present invention has been made in an effort to provide a method for refining magnetic domains of a grain-oriented electrical steel plate and an apparatus thereof having advantages of enhancing efficiency of magnetic domain refinement and improving workability by optimizing equipments and processes, thereby enhancing processing capacity.

The present invention has been also made in an effort to provide a method for refining magnetic domains of a grain-oriented electrical steel plate and an apparatus thereof having advantages of enhancing more iron loss improvement efficiency and minimizing reduction of magnetic flux density.

The present invention has been also made in an effort to provide a method for refining magnetic domains of a grain-oriented electrical steel plate and an apparatus thereof having advantages of enhancing quality of products by more efficiently removing contaminants such as hill up and spatters formed by laser radiating.

The present invention has been also made in an effort to provide a method for refining magnetic domains of a grain-oriented electrical steel plate and an apparatus thereof having advantages of providing an optimal operating environment required for processes.

Technical Solution

An exemplary embodiment of the present invention provides a method for refining magnetic domains of a grain-oriented electrical steel plate including: a steel plate supporting roll position adjusting step of controlling a vertical direction position of the steel plate while supporting the steel plate; a laser radiating step of melting the steel plate by radiating a laser beam to form grooves on the surface of the steel plate; and a setting and maintaining step of setting and maintaining an internal operation environment of a laser room in which the laser radiation is performed.

The method for refining the magnetic domains may further include a warp control step of allowing the steel plate to move along the center of a production line without horizontal biasing.

The method for refining the magnetic domains may further include a tension control step of applying tension to the steel plate so as to keep the steel plate in a flatly unfolded state.

The setting and maintaining step may include steps of isolating the inside of the laser room from the outside to block the inflow of external contaminants, and controlling an internal temperature, pressure, and humidity of the laser room.

The method for refining the magnetic domains may further include a post-treatment step of removing hill up and spatters formed on the surface of the steel plate through the laser radiating step.

The post-treatment step may include a brushing step of removing the hill up and the spatters smeared on the surface of the steel plate by a brush roll.

The post-treatment step may further include a cleaning step of additionally removing the hill up and the spatters remaining on the surface of the steel plate by electrolytically reacting the steel plate with an alkali solution and a filtering step of filtering foreign substances included in the alkali solution removed from the steel plate in the cleaning step from the alkali solution.

The warp control step may include a warp amount measuring step of measuring a warp amount when a width center position of the steel plate deviates from the center of the production line, and a warp amount controlling step of controlling a warp amount of the steel plate by rotating and moving a shaft of the steering roll according to the warp amount of the steel plate measured in the warp amount measuring step to adjust the moving direction of the steel plate.

In the warp amount controlling step, the warp amount of the steel plate may be controlled within ±1 mm.

The tension controlling step may include a steel plate tension applying step of applying tension to the steel plate by the tension bridle roll, a steel plate tension measuring step for measuring the tension of the steel plate subjected to the steel plate tension applying step, and a steel plate tension controlling step of controlling the tension of the steel plate by adjusting a speed of the tension bridle roll according to the tension of the steel plate measured in the steel plate tension measuring step.

The steel plate supporting roll position adjusting step may include a steel plate supporting step of supporting the steel plate positioned in the laser radiating step by the steel plate supporting roll, a brightness measuring step of measuring brightness of a flame occurring when the laser is radiated to the steel plate in the laser radiating step, and a steel plate supporting roll position control step of controlling the steel plate to be located within a depth of focus of the laser by adjusting the position of the steel plate supporting roll by the steel plate supporting roll position control system according to the brightness of the flame measured in the brightness measuring step.

The laser radiating step may include a laser radiating and energy transmission step of forming grooves having an upper width, a lower width and a depth within 70 μm, within 10 μm, and 3 to 30 μm, respectively, by radiating the laser beam radiated from the laser oscillator to the surface of the steel plate by the optical system, and simultaneously transmitting to the steel plate the laser beam energy density within the range of 1.0 to 5.0 J/mm² required for the melting of the steel plate so that a re-coagulation part remaining on the inner wall surface of the groove of the melting part is generated during the laser beam radiating.

The laser radiating step may include a laser beam oscillation control step of controlling the laser oscillator oscillating the laser beam to turn on under normal operation conditions by a laser oscillator controller and controlling the laser oscillator to turn off when the steel plate warp amount is 15 mm or more.

In the laser radiating step, the laser oscillator may oscillate a Gaussian energy distribution continuous wave laser beam.

In the laser radiating step, the optical system may adjust an interval of the laser beam radiation line to 2 to 30 mm in the rolling direction by controlling a laser scanning speed.

The laser radiating step may further include an angle changing step of changing a radiation line angle of the laser beam radiated on the surface of the steel plate.

In the angle changing step, the radiation line angle of the laser beam with respect to the width direction of the steel plate may be changed to a range of ±4°.

In the laser radiating step, with respect to the surface of the steel plate progressing in contact with the surface of the steel plate supporting roll in the form of an arc, by setting as a reference point an radiating position of the laser beam when the radiating direction of the laser beam passes through a central axis of the steel plate supporting roll, the laser beam may be radiated to a position separated at a angle along an outer peripheral surface from the center of the steel plate supporting roll at the reference point.

In the laser radiating step, the laser beam may be radiated in a range of 3 to 7° separated from the center of the steel plate supporting roll along the outer peripheral surface thereof with respect to the reference point.

The laser radiating step may further include a shielding step of shielding scattering light and heat of the laser beam from flowing into the optical system of the laser radiating equipment.

The laser radiating step may further include a dust collecting step of sucking and removing the fumes and the molten iron generated when the laser beam is radiated.

The dust collecting step may include a spraying step of removing the molten iron remaining in the grooves by spraying compressed dry air into the grooves of the steel plate.

Another exemplary embodiment of the present invention provides an apparatus for refining magnetic domains of a grain-oriented electrical steel plate including: a steel plate supporting roll position adjusting equipment of controlling a vertical direction position of the steel plate while supporting the steel plate; a laser radiating equipment of melting the steel plate by radiating a laser beam to form grooves on the surface of the steel plate; and a laser room of accommodating the steel plate supporting roll position adjusting equipment and the laser radiating equipment separately from the outside and providing an operating environment for radiating the laser.

The apparatus for refining magnetic domains may further include a warp control equipment for allowing the steel plate to move along the center of the production line without horizontal biasing.

The apparatus for refining magnetic domains may further include a tension control equipment for applying tension to the steel plate so as to keep the steel plate in a flatly unfolded state.

The laser room may accommodate the laser radiating equipment and the steel plate supporting roll position adjusting equipment to form an internal space to separate the equipments from the outside and has an inlet and an outlet formed at both sides in a progressing direction of the steel plate, and include a positive pressure device for raising the internal pressure of the laser room therein, an optical system lower frame separating an upper space in which the optical system of the laser radiating equipment is positioned from a lower space through which the steel plate passes, and a constant temperature and humidity controller for controlling the internal temperature and humidity of the laser room.

The apparatus for refining magnetic domains may further include a post-treatment equipment for removing hill up and spatters formed on the surface of the steel plate.

The post-treatment equipment may include a brush roll which is disposed at the rear end of the laser room to remove the hill up and the spatters on the surface of the steel plate.

The post-treatment equipment may further include a cleaning unit which is disposed at the rear end of the brush roll to additionally remove the hill up and the spatters remaining on the surface of the steel plate by electrolytically reacting the steel plate with an alkali solution and a filtering unit which is connected to the cleaning unit to filter foreign substances included in the alkali solution of the cleaning unit from the alkali solution.

The warp control equipment may include steering rolls for shifting a moving direction of the steel plate, a warp measurement sensor for measuring a degree (warp amount) when a width center position of the steel plate deviates from the center of the production line, and a steel plate center position control system for controlling a moving direction of the steel plate by rotating and moving shafts of the steering rolls according to the output value of the warp measurement sensor.

The tension control equipment may include tension bridle rolls for guiding movement of the steel plate while applying a tension to the steel plate, a steel plate tension measuring sensor for measuring the tension of the steel plate passing through the tension bridle roll, and a steel plate tension control system for adjusting speeds of the tension bridle rolls according to the tension of the steel plate measured by the steel plate tension measuring sensor.

The steel plate supporting roll position adjusting equipment may include a steel plate supporting roll for supporting the steel plate to the position of the laser radiating equipment, a brightness measurement sensor for measuring brightness of flame occurring when the laser is radiated to the steel plate in the laser radiating equipment, and a steel plate supporting roll position control system for controlling the position of the steel plate supporting roll in accordance with the brightness of the flame measured by the brightness measurement sensor.

The laser radiating equipment may include a laser oscillator for oscillating a continuous wave laser beam, and an optical system of forming grooves having an upper width, a lower width and a depth within 70 μm, within 10 μm, and 3 to 30 μm, respectively, by radiating the laser beam oscillated from the laser oscillator onto the steel plate surface, and simultaneously transmitting to the steel plate the laser energy density within the range of 1.0 to 5.0 J/mm² required for the melting of the steel plate so that a re-coagulation part remaining on the inner wall surface of the groove of the melting part is generated during the laser radiating.

The laser radiating equipment may further include a laser oscillator controller of controlling the laser oscillator to turn on under normal operation conditions by a laser oscillator controller and controlling the laser oscillator to turn off when the steel plate warp amount is 15 mm or more.

The laser oscillator may oscillate a Gaussian energy distribution continuous wave laser beam.

The optical system may adjust an interval of the laser radiation line to 2 to 30 mm in the rolling direction by controlling a laser scanning speed.

The laser radiating equipment may have a structure which is rotatable by the driver to change the angle of the radiation line of the laser beam with respect to the width direction of the steel plate by rotating the optical system with respect to the steel plate.

The laser radiating equipment may radiate the laser beam to a position separated at a angle along an outer peripheral surface from the center of the steel plate supporting roll at a reference point, by setting as the reference point an radiating position of the laser beam when the radiating direction of the laser beam passes through a central axis of the steel plate supporting roll, with respect to the surface of the steel plate progressing in contact with the surface of the steel plate supporting roll in the form of an arc.

The laser radiating equipment may radiate the laser beam in a range of 3 to 7° separated from the center of the steel plate supporting roll along the outer peripheral surface thereof with respect to the reference point.

The laser radiating equipment may further include a shielding unit of shielding laser scattering light and heat from flowing into the optical system.

The laser radiating equipment may further include molten iron removing equipment for removing fumes and spatters generated by radiating the laser beam to the steel plate.

The molten iron removing equipment may include an air knife for spraying compressed dry air into the grooves of the steel plate to remove molten iron remaining in the grooves, and dust collecting hoods for sucking and removing the fumes and the molten iron.

Advantageous Effects

According to the exemplary embodiment of the present invention, it is possible to secure iron loss improvement rates before and after heat treatment of an electrical steel plate at 5% or more and 10% or more, respectively, by stably performing a magnetic domain refining process by a laser while the steel plate is moved at a high speed of 2 m/sec or more.

Further, it is possible to enhance the magnetic domain refining efficiency and improve the workability, thereby increasing the magnetic domain refining ability.

Further, it is possible to further improve the iron loss improvement efficiency and minimize deterioration of the magnetic flux density.

Further, it is possible to enhance the quality of products by more efficiently removing contaminants such as hill up and spatters formed by laser radiating.

Further, it is possible to mass-produce high-quality products by providing an optimal operating environment required for processes.

MODE FOR INVENTION

The terms used below is for the purpose of describing specific exemplary embodiments only and are not intended to be limiting of the present invention. The singular forms used herein include plural forms as well, if the phrases do not clearly have the opposite meaning. The "including" used in the specification means that a specific feature, region, integer, step, operation, element and/or component is embodied and other specific features, regions, integers, steps, operations, elements, components, and/or groups are not excluded.

Hereinafter, exemplary embodiments of the present invention will be described so as to be easily implemented by those skilled in the art, with reference to the accompanying drawings. As those skilled in the art would realize, the described embodiments may be modified in various different ways, all without departing from the spirit or scope of the present invention. Therefore, the present invention can be implemented in various different forms, and is not limited to the exemplary embodiments described herein.

In the following description, as the present exemplary embodiment, equipment for permanent magnetic domain refinement of a grain-oriented electrical steel plate used in a transformer iron core material and the like will be described.

Figure 1:
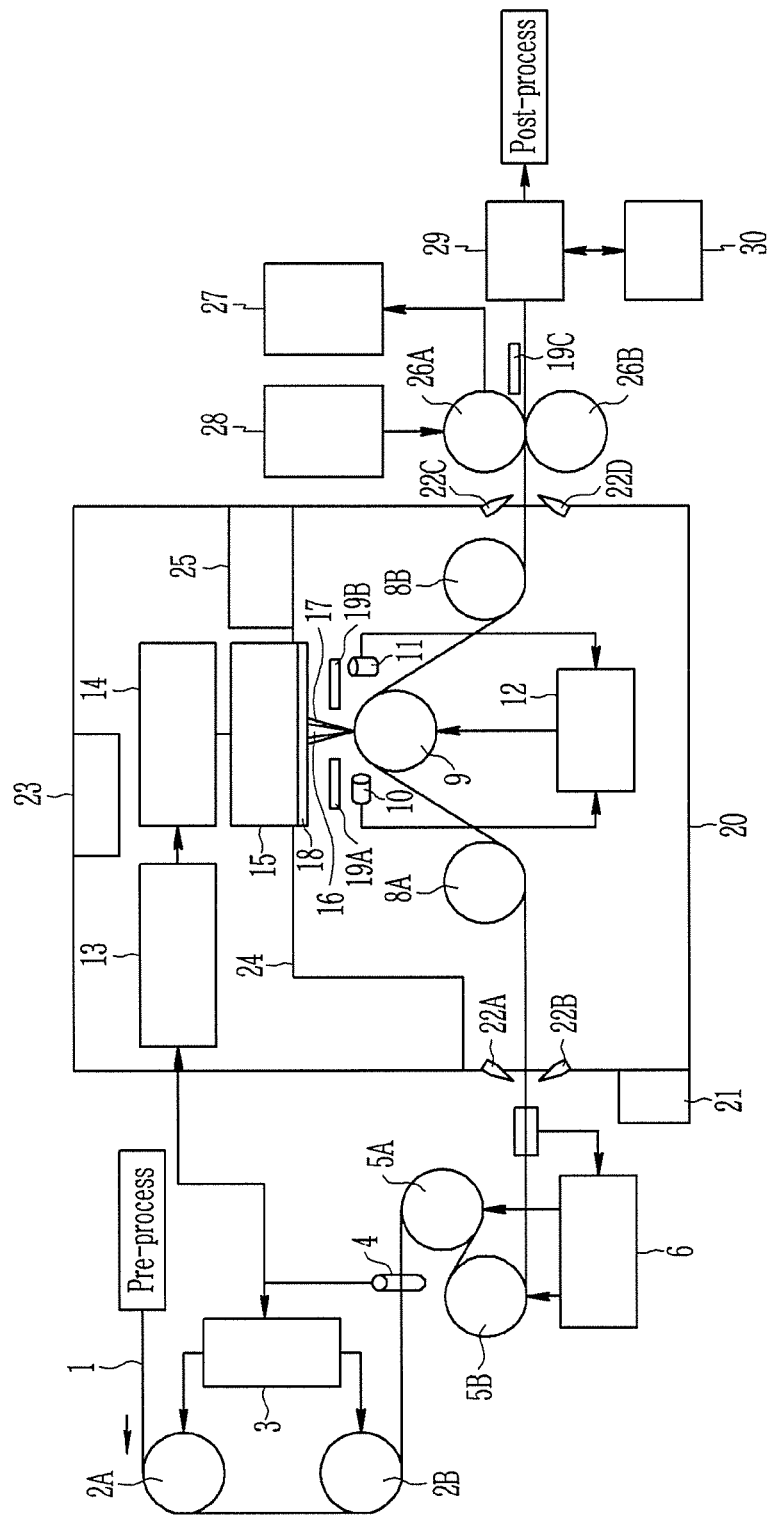
FIG. 1 is a diagram schematically illustrating a configuration of an apparatus for refining magnetic domains of a grain-oriented electrical steel plate according to the present exemplary embodiment.
Figure 2:
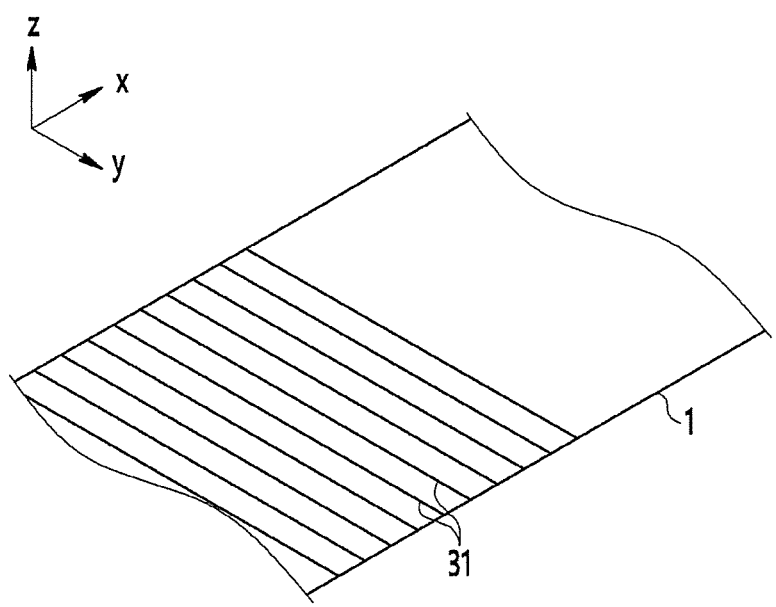
FIG. 2 is a schematic diagram illustrating a steel plate subjected to magnetic domain refinement according to the present exemplary embodiment.

FIG. 1 schematically illustrates an apparatus for refining magnetic domains of a grain-oriented electrical steel plate according to the present exemplary embodiment and FIG. 2 illustrates a steel plate subjected to magnetic domain refinement according to the present exemplary embodiment. In the following description, a rolling direction or a steel plate moving direction means an x-axis direction in FIG. 2, a width direction means a y-axis direction in FIG. 2 as a direction perpendicular to the rolling direction, and a width means a length of a steel plate for the y-axis direction. In FIG. 2, reference numeral 31 indicates a radiation line formed continuously on the surface of a steel plate 1 with a groove shape dented by a laser beam.

Referring to FIG. 1, the apparatus for refining the magnetic domains of the grain-oriented electrical steel plate according to the present exemplary embodiment stably performs permanent magnetic domain refinement even if the refinement progresses at a high speed of 2 m/s or more.

The apparatus for refining the magnetic domains of the present exemplary embodiment includes a steel plate supporting roll position adjusting equipment for controlling a vertical direction position of the steel plate while supporting the steel plate 1 moving along a production line, a laser radiating equipment for melting the steel plate by radiating a laser beam to form a groove on the surface of the steel plate, and a laser room 20 for accommodating the steel plate supporting roll position adjusting equipment and the laser radiating equipment separately from the outside and providing an operational environment for laser radiating.

In addition, the apparatus for refining the magnetic domains may further include a warp control equipment for allowing the steel plate 1 to move along the center of the production line without horizontal biasing.

In addition, the apparatus for refining the magnetic domains may further include a tension control equipment for applying the tension to the steel plate so as to allow the steel plate to be maintained in a flat state without sagging.

In addition, the apparatus for refining the magnetic domains may further include a post-treatment equipment for removing hill-up and spatter formed on the surface of the steel plate in accordance with the laser beam radiating.

The hill-up refers to a portion where molten iron is accumulated on both sides of the groove portion at a predetermined height or more when the groove is formed by radiating the laser beam to the surface of the steel plate. The spatter refers to molten iron generated during laser beam radiating and solidified on the surface of the steel plate.

The warp control equipment may include steering rolls 2A and 2B for shifting a moving direction of the steel plate 1, a warp measurement sensor 4 for measuring a degree (warp amount) when a width center position of the steel plate 1 deviates from the center of the production line, and a steel plate center position control system 3 for controlling a moving direction of the steel plate 1 by rotating and moving shafts of the steering rolls 2A and 2B by calculating a detection signal of the warp measurement sensor 4.

The warp measurement sensor 4 is disposed at the rear end of the steering roll 2B to detect in real time the actual warp amount of the steel plate passing through the steering roll.

It is possible to form the grooves on the surface of the steel plate over the entire width of the steel plate by straightly moving the steel plate along the center of the production line without horizontal biasing by the warp control equipment.

In the warp control equipment, the warp amount of the steel plate is measured by the warp measurement sensor 4 in the process before the grooves are formed on the surface of the steel plate by laser radiating. The values measured by the warp measurement sensor 4 are output to the steel plate center position control system, and the steel plate center position control system calculates the output values of the warp measurement sensor and rotates and moves the axes of the steering rolls 2A, 2B according to the calculated warp degree. As described above, the steering rolls 2A and 2B are rotated and moved, so that the moving direction of the steel plate wound on the steering roll is adjusted. Thus, the warp amount of the steel plate is controlled, and the warp amount of the steel plate 1 may be controlled within ±1 mm.

The tension control equipment may include tension bridle rolls (TBRs) 5A and 5B for guiding movement of the steel plate 1 while applying a predetermined tension to the steel plate 1, a steel plate tension measuring sensor 7 for measuring the tension of the steel plate 1 passing through the tension bridle roll, and a steel plate tension control system 6 for adjusting speeds of the tension bridle rolls 5A and 5B according to the tension of the steel plate measured by the steel plate tension measuring sensor 7.

The steel plate tension measuring sensor 7 is disposed at the rear end of the tension bridle roll 5B and measures the actual tension of the steel plate subjected to the tension via the tension bridle roll 5B in real time.

In the present exemplary embodiment, the tension of the steel plate may be set so as to prevent the breakage of the steel plate from occurring due to excessively tension while making the shape of the surface of the steel plate flat at the laser radiating position of the laser radiating equipment.

In order to operate the tension control equipment by the steel plate tension within a predetermined range, the tension control equipment adjusts the speeds of the tension bridle rolls (TBR) 5A and 5B by the steel plate tension control system 6 according to the tension of the steel plate measured by the steel plate tension measurement sensor 7. Thus, the tension control equipment controls a tension error of the steel plate 1 to be within the predetermined range to apply the tension to the steel plate.

The steel plate passing through the tension control equipment flows into the laser room 20, and is subjected to the magnetic domain refinement through the steel plate supporting roll position adjusting equipment and the laser radiating equipment and then discharged to the outside of the laser room 20. The laser room will be described below again.

In the present exemplary embodiment, a steel plate supporting roll 9 is disposed directly below the laser radiating equipment in the laser room 20, and deflector rolls 8A and 8B are provided on both sides with the steel plate supporting roll interposed therebetween.

The moving direction of the steel plate 1 is shifted toward the steel plate supporting roll 9 by the deflector rolls 8A and 8B. While the steel plate 1 passes through the deflector roll 8A, the moving direction is shifted toward the steel plate supporting roll 9 so that the steel plate 1 is in contact with the steel plate supporting roll 9, and then the moving direction is shifted toward the deflector roll 8B so that the steel plate 1 moves through the deflector roll 8B.

The steel plate 1 is wound in an arc form along the steel plate supporting roll 9 by the deflector roll and passes while being in surface contact with the steel plate supporting roll. In order to minimize the variation of the focal distance of the laser beam due to the vibration and waving of the steel plate during the radiating of the laser beam, the steel plate needs to pass while being sufficiently in surface contact with the steel plate supporting roll, and in this state, the laser beam needs to be radiated to the steel plate progressing along the steel plate supporting roll. In the present exemplary embodiment, as the steel plate is in surface contact with the steel plate supporting roll as described above, it is possible to accurately radiate the laser beam to the steel plate.

The steel plate supporting roll position adjusting equipment may include a steel plate supporting roll 9 for supporting the steel plate 1 to the laser radiating position of the laser radiating equipment, a brightness measurement sensor 10 for measuring brightness of flame occurring when the laser is radiated to the steel plate in the laser radiating equipment, and a steel plate supporting roll (SPR) position control system 12 for controlling the position of the steel plate supporting roll 9 in accordance with the brightness of the flame measured by the brightness measurement sensor 10.

The steel plate supporting roll position adjusting equipment is configured to support the steel plate 1 to the position of the laser radiating unit by the steel plate supporting roll 9 and entirely vertically adjust the position of the steel plate 1 to be disposed in a depth of focus having high laser steel plate radiating efficiency so that the brightness of the flame generated when the steel plate is radiated with the laser becomes the best. Further, the brightness of the flame generated when the steel plate is radiated with the laser is measured by using the brightness measurement sensor 10.

In the present exemplary embodiment, the steel plate supporting roll position adjusting equipment may further include a distance measurement sensor 11 for measuring an actual distance from the optical system of the laser radiating equipment to the surface of the steel plate. The steel plate supporting roll position control system 12 calculates the brightness of the flame detected from the brightness measurement sensor 10 and the distance between the optical system and the surface of the steel plate actually measured from the distance measuring sensor 11 to more precisely control the position of the steel plate supporting roll 9.

The warp control equipment, the tension control equipment, and the steel plate supporting roll position adjusting equipment serve to make steel plate conditions at the laser radiating position so that the laser grooves may be formed precisely on the steel plate by the laser radiating equipment. In the steel plate at the laser radiating position, the center position of the steel plate needs to be positioned at the center position of the production line and the distance from the optical system needs to be maintained at the set value.

The laser radiating equipment may include a laser oscillator controller 13, a laser oscillator 14 for oscillating a continuous wave laser beam 16, and an optical system 15.

Figure 3:
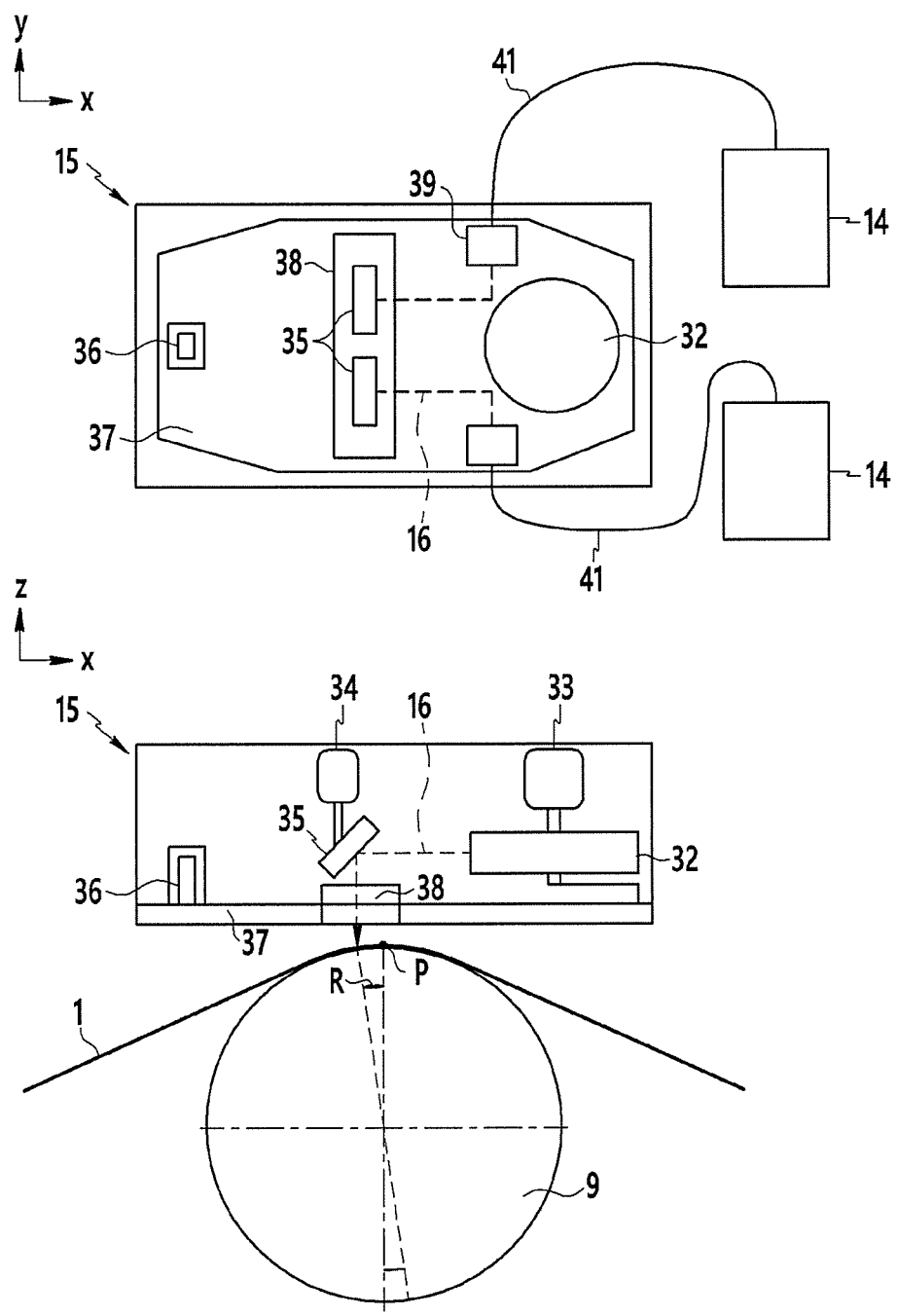
FIG. 3 is a schematic diagram illustrating a configuration of an optical system of a laser radiating equipment according the present exemplary embodiment.

As illustrated in FIG. 3, the optical system 15 may include a module plate 37 which is rotatably provided to give an angle of a laser beam radiation line in a width direction of the steel plate, a driver 36 for rotating the module plate 37, a header 39 which is provided in the module plate 37 to radiate a laser beam applied from the laser oscillator 14 into the optical system 15, a polygon mirror 32 which is rotatably provided in the module plate 37 to reflect the laser beam radiated from the header 39, a rotary motor 33 rotatably driving the polygon mirror 32, a light collection mirror 35 which is provided in the module plate 37 to reflect the laser beam reflected from the polygon mirror 32 toward to the steel plate and collect the reflected laser beam in the steel plate, a driving motor 34 which is connected to the light collection mirror 35 to adjust a focal distance of the laser beam by moving the light collection mirror 35, and a shutter 38 which is provided in the module plate 37 to block selectively the module plate 37 according to radiation of the laser beam.

The optical system 15 is configured by arranging the header 39, the polygon mirror 32, the light collection mirror 35, and the shutter in the module plate 37 forming an optical box to form one body. The laser oscillator 14 and the header 39 are connected to, for example, an optical cable 41. As a result, the laser emitted from the laser oscillator 14 is transmitted to the header 39 via the optical cable 41. The header 39, the polygon mirror 32, the light collection mirror 35 are arranged at regular positions in the module plate 37 forming the optical box so as to reflect the laser beam 16 to a desired position. As illustrated in FIG. 3, for example, the headers 39 are disposed at both sides with the polygon mirror 32 therebetween to radiate the laser beam to the polygon mirror 32, respectively. Two light collection mirrors 35 are disposed according to each laser beam reflected from the polygon mirror 32. The laser beam emitted from the header 39 is reflected from the polygon mirror 32 rotating according to the driving of the rotary motor 33 to be transmitted to the light collection mirror 35. The laser beam 16 reflected to the light collection mirror 35 is reflected from the light collection mirror 35 to the steel plate side through the shutter 38 to be collected on the surface of the steel plate 1. As a result, the laser beam is periodically radiated on the surface of the steel plate to form continuous grooves in a width direction.

The entire focal distance of the laser beam 16 by the optical system 15 is adjusted by vertical movement of the steel sheet supporting roll 9, and misalignment of a horizontal focal distance is adjusted by the driving motor 34 which is connected to the light collection mirror 35.

The shutter 38 is provided below the module plate 37 to close and open the module plate 37. The shutter 38 is opened when the laser beam is radiated downward from the light collection mirror 35 to prevent interference with the laser beam and closed when the laser beam is not radiated to prevent external fumes or foreign substances from flowing into the optical system 15.

If the warp amount of the steel plate is excessive, the steel plate deviates from the laser radiating position, and the steel plate supporting roll 9 is radiated with the laser to be damaged. As a result, in order to prevent the damage to the steel plate supporting roll, the laser oscillator controller 13 turns on the laser oscillator under normal operation conditions and controls the laser oscillator to turn off when the steel plate warp amount is 15 mm or more.

The laser oscillator 14 may oscillate a Gaussian energy distribution continuous wave laser beam to transmit the oscillated laser beam to the optical system 15. The optical system 15 radiates the transmitted laser beam 16 to the surface of the steel plate.

The laser oscillator 14 and the optical system 15 may radiate the laser beam to the surface of the steel plate to form grooves with an upper width, a lower width and a depth of 70 μm or less, 10 μm or less, and 3 to 30 μm, respectively, and transmit laser energy density to the steel plate in the range of 1.0 to 5.0 J/mm$^2$ required for melting the steel plate so that a re-coagulation portion is generated to remain on the inner wall surface of the groove in the melting portion during laser radiating.

The optical system 15 has a function of controlling a laser scanning speed to adjust an interval of the laser radiation line (31 in FIG. 2) to 2 to 30 mm in the rolling direction. Therefore, the influence of a heat affected zone (HAZ) by the laser beam may be minimized, thereby improving the iron loss of the steel plate.

The laser radiating equipment may be a structure for changing the angle of the radiation line of the laser beam radiated on the surface of the steel plate with respect to the width direction of the steel plate. In the present exemplary embodiment, the laser radiating equipment may change the angle of the radiation line of the laser beam to a range of ±4° with respect to the width direction of the steel plate.

To this end, the laser radiating equipment may be a structure of changing the angle of the radiation line of the laser beam formed on the surface of the steel plate with respect to the width direction of the steel plate because the optical system 15 for radiating the laser beam to the steel plate is rotatable by a driving unit 36. As such, the angle of the radiation line of the laser beam is changed by the optical system, and thus, the radiation line 31 by the laser beam is inclined in the range of ±4° in a direction perpendicular to the rolling direction of the steel plate. Therefore, it is possible to minimize the decrease in the magnetic flux density due to the groove formation by the laser.

Further, in the present exemplary embodiment, the laser radiating equipment controls the radiating position of the laser beam to the steel plate 1 to have a structure for preventing a back reflection phenomenon in which the laser beam radiated to the steel plate is reflected from the steel plate to enter the optical system or the laser oscillator.

To this end, as illustrated in FIG. 3, the laser radiating equipment may be a structure in which the laser beam is radiated to a position separated at an angle (hereinafter, referred to as a separation angle R for convenience of description) along an outer peripheral surface at the center of the steel plate supporting roll 9 from a reference point P by setting as a reference point P a laser beam radiating position when the radiating direction of the laser beam radiated from the optical system 15 passes through the central axis of the steel plate supporting roll 9, with respect to the surface of the steel plate which progresses in contact with the surface of the steel plate supporting roll 9 in an arc form.

The reference point P is a point in which the steel plate meets a line passing through the central axis of the steel plate supporting roll 9 in FIG. 3. When the radiating direction of the laser beam passes through the central axis of the steel plate supporting roll 9, the focal point of the laser beam is adjusted to the reference point P. In this case, as the radiating direction of the laser beam is orthogonal to a tangential line of the steel plate supporting roll 9 at the reference point P, a back reflection phenomenon occurs, in which the laser beam reflected onto the steel plate enters the optical system and the laser oscillator as it is to damage the steel plate.

The laser radiating equipment according to the present exemplary embodiment radiates the laser beam to the position separated by the separation angle R at the reference point P and thus the laser beam reflected back from the steel plate is not incident to the optical system. Therefore, it is possible to prevent the back reflection phenomenon and to maintain the quality of the groove shape formed by the laser beam.

In the present exemplary embodiment, the separation angle R may be set in a range of 3 to 7° along the outer peripheral surface at the center of the steel plate supporting roll 9 with respect to the reference point P.

When the separation angle R, which is the position at which the laser beam is radiated, is smaller than 3°, a part of the laser beam reflected back from the steel plate may be introduced into the optical system or the laser oscillator. If the separation angle R exceeds 7°, the grooves are not properly formed by the laser beam and a formation defect of the groove may occur.

As such, the laser radiating equipment according to the present exemplary embodiment radiates the laser beam to the steel plate at a position separated from the reference point P by a predetermined angle, thereby preventing the back reflection phenomenon and stably maintaining the quality of the groove shape formed by the laser beam.

The laser radiating equipment may further include a molten iron removing equipment for removing fumes and spatters generated by radiating the laser beam onto the steel plate.

The molten iron removing equipment may include an air knife 17 for spraying compressed dry air into the grooves of the steel plate to remove molten iron remaining in the grooves, and dust collecting hoods 19A and 19B for sucking and removing the fumes and the molten iron. The fumes generated during the laser radiating through the air knife and the dust collecting hoods are removed to prevent the fumes from flowing into the optical system. The air knife 17 sprays compressed dry air having a predetermined pressure Pa into the groove of the steel plate 1 to remove the molten iron remaining in the groove. The compressed dry air in the air knife 17 preferably has a pressure Pa of 0.2 kg/cm$^2$ or more. When the pressure of the compressed dry air is smaller than 0.2 kg/cm$^2$, it is impossible to remove the molten iron in the groove and thus, the iron loss improvement effect can not be secured. The fumes and the spatters removed by the air knife are removed by the dust collecting hoods 19A and 19B disposed before and after the laser radiating position.

In addition, the laser radiating equipment may further include a shielding unit 18 for shielding reflected light, scattered light, and radiant heat of the laser beam from flowing into the optical system. The shielding unit 18 shields the reflected light and scattered light flowing into the optical system by reflection and scattering of the laser beam 16 radiated onto the steel plate to prevent the optical system from being thermally deformed by the radiant heat due to the reflected light and scattered light.

The laser room 20 is a room structure having an internal space and accommodates the laser radiating equipment and the steel plate supporting roll position control equipment therein to isolate the equipments from the outside and provide an appropriate operating environment for smooth driving thereof.

An inlet and an outlet of the laser room 20 are formed on the entrance and exit sides of the laser room 20 along the progressing direction of the steel plate. The laser room 20 has equipment for blocking the inflow of contaminants so that the internal space is not contaminated by external dust or the like. To this end, the laser room 20 has a positive pressure device 23 for raising the internal pressure beyond the outside. The positive pressure device 23 maintains the internal pressure of the laser room 20 relatively higher than the external pressure. Thus, it is possible to prevent foreign substances from flowing into the laser room 20. In addition, air curtains 22A, 22B, 22C, and 22D are provided at the inlet and the outlet of the steel plate. The air curtain sprays air to the inlet and the outlet, which are passages through which the steel plate enters and exits the laser room 20 to form a film, thereby blocking dust and the like from flowing into through the inlet and the outlet. In order to prevent contamination in the laser room 20, a shower booth 21 may be installed on the door, which is an entrance of the laser room 20. The shower booth 21 removes foreign substances adhering to the body of a passenger entering the laser room 20.

The laser room 20 is a space in which the process of refining the magnetic domains of the steel plate by the laser beam substantially progresses, and it is necessary to minimize a change of the internal environment and maintain a proper environment. To this end, the laser room 20 includes an optical system lower frame 24 for separating an upper space, in which the laser oscillator 14 and the optical system 15 of the laser radiating equipment are located, from a lower space through which the steel plate 1 passes, and a constant temperature and humidity controller 25 for controlling the internal temperature and humidity of the laser room 20.

The optical system lower frame 24 can more thoroughly manage an operating environment of the main equipment such as the laser oscillator 14 and the optical system 15. The optical system lower frame 24 is installed in the laser room 20 so as to separate the lower space of the optical system through which the steel plate passes, from the upper space of the optical system where the laser oscillator and the optical system mirrors are located. The upper space of the optical system is also separated from the inside of the laser room 20 by the optical system lower frame 24 to prevent contamination and easily control the temperature and humidity with respect to major equipments such as the laser oscillator and the optical system.

The constant temperature and humidity controller 25 adjusts the temperature and humidity inside the laser room 20 to provide a proper environment. In the present exemplary embodiment, the constant temperature and humidity controller 25 may maintain the internal temperature of the laser room 20 at 20 to 25° C. and maintain the humidity at 50% or less.

As described above, the internal space of the laser room 20 is continuously maintained at a temperature and humidity suitable for the operating environment, and the process of refining the magnetic domains may be performed on the steel plate in an optimum state. Therefore, a high-quality product may be mass-produced under an optimal operating environment required for the process.

The apparatus for refining the magnetic domains of the present exemplary embodiment may further include a post-treatment equipment for removing hill-up and spatters formed on the surface of the steel plate.

Since the hill-up and spatters cause deterioration of an insulation property of the product and a space factor, the hill-up and spatters are completely removed through the post-treatment equipment to enhance the quality of the product.

The post-treatment equipment may include brush rolls 26A and 26B disposed at the rear end of the laser room 20 along a steel plate moving direction to remove the hill up and spatters of the steel plate surface. The brush rolls 26A and 26B are rotated at a high speed by a driving motor, and a rotation speed and an interval with the steel plate are controlled by a current control system that controls a current value of the driving motor generated during operation to a set target value and a brush position control system that controls an interval between the brush roll and the steel plate. The brush roll may be disposed on only one side of the steel plate having grooves formed by the laser beam, or on both sides of the steel plate. The brush rolls 26A and 26B are brought into close contact with the surface of the steel plate and are rotated at a high speed to remove the hill up, the spatters, and the like attached to the surface of the steel plate. As illustrated in FIG. 1, a dust collecting hood 19C for discharging the hill up and the spatters removed by the brush roll is further provided near the brush rolls 26A and 26B. The dust collecting hood 19C sucks molten iron such as the hill up and the spatters which are separated from the steel plate by the brush rolls 26A and 26B, and discharges the molten iron to the outside.

Further, the post-treatment equipment may further include a cleaning unit 29 disposed at the rear end of the brush rolls 26A and 26B to further additionally remove the hill up and spatters remaining on the surface of the steel plate by electrolytically reacting the steel plate with an alkali solution, and a filtering unit 30 connected to the cleaning unit to filter the foreign substances included in the alkali solution of the cleaning unit from the alkali solution.

The hill up and the spatters of the steel plate are primarily removed via the brush rolls 26A and 26B, and are secondarily removed via the cleaning unit 29. Thus, it is possible to enhance the product quality by more completely removing the hill up and the spatters attached to the surface of the steel plate.

The cleaning unit 29 is filled with an alkali solution therein, and the filtering unit 30 is connected to one side. As the steel plate is processed through the cleaning unit, the hill up and the spatters removed from the steel plate are accumulated in the internal alkali solution, thereby deteriorating the cleaning performance of the steel plate. The filtering unit 30 circulates the alkali solution of the cleaning unit and removes the hill up and the spatters included in the alkali solution. The filtering unit 30 removes the hill up and the spatters to control the iron content of the alkali solution to 500 ppm or less. As such, it is possible to continuously process the steel plate by preventing deterioration of the cleaning performance of the cleaning unit.

Hereinafter, the process of refining the magnetic domains of the electrical steel plate according to the present exemplary embodiment will be described below.

The continuously conveyed steel plate is introduced into the laser room through the warp control equipment and the tension control equipment to progress at a velocity of 2 m/sec or more, and subjected to the magnetic domain refinement. The steel plate introduced into the laser room is subjected to the permanent magnetic domain refinement through the laser radiating equipment and then drawn out to the outside of the laser room. The steel plate drawn out to the outside of the laser room is sent to the post-treatment after the hill up, the spatters, and the like remaining on the surface are removed through the post-treatment equipment.

In this process, the laser room in which the laser beam is radiated to the surface of the steel plate is appropriately set and maintained in the internal operating environment so as to provide an optimal environment for the magnetic domain refinement.

The laser room isolates the inside from the outside to block the inflow of external contaminants, and controls the internal temperature, pressure and humidity of the laser room according to the operating environment for the magnetic domain refinement.

The internal pressure of the laser room is maintained to be higher than that of the outside so as to prevent foreign substances such as external dust from flowing into the laser room. In addition, by forming a film of air on the inlet and the outlet, which are the passages through which the steel plate is moved, it is possible to prevent foreign substances such as dust from flowing into the laser room in the process where the steel plate progresses through the inlet and the outlet.

Further, the constant temperature and humidity controller installed in the laser room maintains the temperature inside the laser room at 20 to 25° C. and maintains the humidity at 50% or less, thereby providing an optimum condition for the magnetic domain refinement by laser radiating.

As such, the laser room provides an optimal environment for laser beam radiating, and the steel plate is accurately positioned at the laser radiating position while passing through the warp control equipment, the tension control equipment, and the steel plate supporting roll position adjusting equipment.

First, for the magnetic domain refinement, the steel plate is moved straightly along the center of the production line without horizontal biasing by controlling the progressing direction through the warp control equipment.

The warp measurement sensor continuously detects the warp amount of the steel plate, and when the steel plate is warped, the steel plate center position control system rotates and moves the shaft of the steering roll by calculating a signal detected by the warp measurement sensor to move the steel plate to a correct position. Thus, by continuously controlling the steering rolls according to the position of the steel plate, the steel plate may be continuously moved without departing from the center of the production line.

The steel plate is moved through the tension bridle roll for controlling the tension via the steering roll. The tension of the steel plate passing through the tension bridle roll is detected by the tension measurement sensor. The steel plate tension control system calculates a measurement value detected by the tension measurement sensor and controls the speed of the tension bridle roll according to the set tension. Thus, the tension of the steel plate to be moved may be maintained continuously in accordance with the set range.

The steel plate passed through the tension bridle roll is introduced into the laser room through the inlet of the laser room. The steel plate is shifted inside the laser room by the bridle roll and moved in a state of being in close contact with the steel plate supporting roll located between the two bridle rolls.

The steel plate supporting roll moves the steel plate up and down to position the steel plate in the depth of focus of the laser beam.

When the laser beam is radiated from the laser radiating equipment to the steel plate, the brightness measurement sensor detects the brightness of the flame on the steel plate surface in real time, and the steel plate supporting roll position control system moves the steel plate supporting roll up and down according to the measured value detected by the brightness measuring sensor to allow the steel plate to be positioned within the depth of focus of the laser beam. Thus, the laser beam is effectively radiated onto the surface of the steel plate, to form a high-quality radiation line.

The laser oscillator controller turns on/off the laser oscillator according to the warp degree of the steel plate. The laser oscillator controller is connected to the warp measurement sensor, and determines that the steel plate deviates too much from the steel plate supporting roll when the warp amount of the steel plate measured from the warp measurement sensor is, for example, 15 mm or more to turn off the laser oscillator. Thus, it is possible to prevent the roll from being damaged by radiating the laser beam on to the surface of the steel plate supporting roll via the warped steel plate.

According to a command of the laser oscillator controller, the laser beam generated by the laser oscillator is radiated onto the surface of the steel plate through the optical system. The laser oscillator oscillates a $TEM_{00}$ continuous wave laser beam to transmit the oscillated laser beam to the optical system.

The optical system changes the direction of the laser beam and radiates the laser onto the surface of the steel plate to continuously form a molten groove on the surface of the steel plate, thereby performing the magnetic domain refinement.

While the surface of the steel plate is molten by the laser beam radiated to the steel plate through the optical system, the molten groove is formed along the radiation line. In the present exemplary embodiment, grooves having an upper width, a lower width and a depth within 70 μm, within 10 μm, and 3 to 30 μm, respectively, are formed on the surface of the steel plate through the laser beam radiating. Simultaneously, the laser oscillator and the optical system transmit the laser energy density within the range of 1.0 to 5.0 J/mm$^2$ required for the melting of the steel plate to the steel plate so that a re-coagulation part remaining on the inner wall surface of the groove of the melting part is generated during the laser radiating.

Further, by radiating the laser beam at a position R separated from the reference point P in the laser beam radiating process through the optical system, the laser beam reflected back from the steel plate is not incident to the optical system. Therefore, the back reflection phenomenon may be prevented, and the incident light path of the laser beam is not interfered by the reflected light, thereby maintaining the quality of the groove shape formed by the laser beam.

The optical system has a function of controlling a laser scanning speed to adjust the interval of the laser radiation lines with respect to the rolling direction. Further, the optical system has a rotation function to change the angle of the laser radiation line. In the present exemplary embodiment, it is possible to adjust the interval of the laser radiation lines by 2 to 30 mm in the rolling direction by the optical system, thereby minimizing the influence of the heat affected zone (HAZ) by the laser beam and improving the iron loss of the steel plate. Further, in the laser beam radiating process, the angle of the radiation line of the laser beam radiated on the surface of the steel plate may be changed through the rotation of the optical system. In the present exemplary embodiment, the optical system may change the angle of the radiation line of the laser beam into the range of ±4° with respect to the width direction of the steel plate. That is, it is possible to form the radiation line 31 of the laser beam so as to be tilted in the range of ±4° with respect to the y-axis direction in FIG. 2. Therefore, the radiation lines formed on the surface of the steel plate may be formed to be tilted in the range of 86 to 94° with respect to the rolling direction. By forming the radiation line in such a manner as to be tilted with respect to the y-axis direction, it is possible to minimize the decrease in the magnetic flux density due to the groove formation by the laser.

In the laser beam radiating process, while the steel plate is molten by the laser beam, a large amount of fumes and molten iron spatters are generated. The fumes and the spatters contaminate the optical system, and if the molten iron remains in the groove, it is difficult to form a precise groove and the iron loss is not improved, and as a result, the product quality is deteriorated. Thus, the compressed dry air is sprayed into the grooves of the steel plate to remove the molten iron remaining in the grooves, and the fumes and the molten iron are directly sucked through the dust collecting hood to be removed. Therefore, it is possible to prevent the fumes from flowing into the optical system in the process of refining the steel plate magnetic domains, and to enhance the magnetic domain refinement efficiency by rapidly removing the fumes and spatters. Further, it is possible to further prevent the scattered light and heat of the laser beam from flowing into the optical system of the laser radiating equipment during the laser beam radiating process.

The grooves are formed on the surface of the steel plate through the laser beam radiating, and the steel plate subjected to the magnetic domain refinement is continuously moved and discharged to the outside through the outlet of the laser room.

The steel plate discharged from the laser room is subjected t a process of removing the hill-up and the spatters attached to the surface of the steel plate through the post-treatment process.

The steel plate is first in close contact with the steel plate while passing through the brush roll disposed outside the laser room to primarily remove the hill up and the spatters by the brush roll rotating at a high speed.

While the steel plate passing through the brush roll secondarily passes through the cleaning unit, the remaining hill up and spatters are finally removed through the electrolysis reaction between the steel plate and the alkali solution. The steel plate in which the hill up and spatters are removed while passing through the cleaning unit is conveyed to the post-treatment.

TABLE 1

| Iron loss improvement rate (%) | |
|---|---|
| After laser radiating | After heat treatment |
| 9.5 | 11.6 |
| 9.7 | 12.9 |
| 11.5 | 13.5 |
| 8.4 | 11.6 |
| 8.6 | 11.8 |
| 8.5 | 11.7 |

Table 1 above lists an iron loss improvement rate of the grain-oriented electrical steel plate by grooves formed on the surface of the steel plate with a thickness of 0.27 mm by the continuous wave laser beam radiating according to Example. As listed in Table 1, in the case of the steel plate subjected to the magnetic domain refinement by the Example, it can be seen that the iron loss is improved.

While the exemplary embodiments of the present invention have been illustrated and described above, various modifications and other exemplary embodiments may be made by those skilled in the art. All of such modifications and other exemplary embodiments will be considered and included in the appended claims so as not to depart from the true spirit and scope of the present invention.

DESCRIPTION OF SYMBOLS

1: Steel plate
2A, 2B: Steering roll (SR)
3: Steel plate center position control system
4: Warp measurement sensor
5A, 5B: Tension bridle roll
6: Steel plate tension control system
7: Steel plate tension measuring sensor
8A, 8B: Deflector roll
9: Steel plate supporting roll
10: Brightness measurement sensor
11: Distance measurement sensor
12: Steel plate supporting roll position control system
13: Laser oscillator controller
14: Laser oscillator
15: Optical system
16: Laser beam
17: Air knife
18: Shielding unit
19A, 19B, 19C: Dust collecting hood
20: Laser room
21: Shower booth
22A, 22B, 22C, 22D: Air curtain
23: Positive pressure device
24: Optical system lower frame
25: Constant temperature and humidity controller
26A, 26B: Brush roll
27: Motor current control system
28: Brush position control system
29: Cleaning unit
30: Filtering unit
31: Radiation line
32: Polygon mirror
33: Rotary motor
34: Driving motor
35: Light collection mirror
36: Driver
37: Module plate
38: Shutter
39: Header

The invention claimed is:

1. An apparatus for refining magnetic domains of a grain-oriented electrical steel plate, the apparatus comprising:
a steel plate supporting roll position adjusting equipment of controlling a vertical direction position of the steel plate while supporting the steel plate;
a laser radiating equipment of melting the steel plate by radiating a laser beam to form grooves on the surface of the steel plate; and
a laser room of accommodating the steel plate supporting roll position adjusting equipment and the laser radiating equipment separately from the outside and providing an operating environment for radiating the laser,
wherein the laser radiating equipment radiates the laser beam to a position separated at an angle along an outer peripheral surface from the center of the steel plate supporting roll at a reference point, by setting as the reference point an radiating position of the laser beam when the radiating direction of the laser beam passes through a central axis of the steel plate supporting roll and apex of the steel plate supporting roll, with respect to the surface of the steel plate progressing in contact with the surface of the steel plate supporting roll in the form of an arc.

2. The apparatus for refining magnetic domains of claim 1, wherein:
the laser room accommodates the laser radiating equipment and the steel plate supporting roll position adjusting equipment to form an internal space to separate the equipments from the outside and has an inlet and an outlet formed at both sides in a progressing direction of the steel plate, and includes a positive pressure device for raising the internal pressure of the laser room therein, an optical system lower frame separating an upper space in which the optical system of the laser radiating equipment is positioned from a lower space through which the steel plate passes, and a constant temperature and humidity controller for controlling the internal temperature and humidity of the laser room.

3. The apparatus for refining magnetic domains of claim 2, further comprising:
a post-treatment equipment for removing hill up and spatters formed on the surface of the steel plate.

4. The apparatus for refining magnetic domains of claim 3, wherein:
the post-treatment equipment includes a brush roll which is disposed at the rear end of the laser room to remove the hill up and the spatters on the surface of the steel plate.

5. The apparatus for refining magnetic domains of claim 4, wherein:
the post-treatment equipment further includes a cleaning unit which is disposed at the rear end of the brush roll to additionally remove the hill up and the spatters remaining on the surface of the steel plate by electrolytically reacting the steel plate with an alkali solution and a filtering unit which is connected to the cleaning unit to filter foreign substances included in the alkali solution of the cleaning unit from the alkali solution.

6. The apparatus for refining magnetic domains of claim 2, wherein:
the laser radiating equipment has a structure which is rotatable by the driver to change the angle of the radiation line of the laser beam with respect to the width direction of the steel plate by rotating the optical system with respect to the steel plate.

7. The apparatus for refining magnetic domains of claim 2, wherein:
the laser radiating equipment includes molten iron removing equipment for removing fumes and spatters generated by radiating the laser beam to the steel plate.

8. The apparatus for refining magnetic domains of claim 2, wherein:
the laser radiating equipment includes a shielding unit of shielding laser reflecting light and scattering light from flowing into the optical system.

9. The apparatus for refining magnetic domains of claim 2, wherein:
the laser radiating equipment includes an air knife for spraying compressed dry air into the grooves of the steel plate to remove molten iron remaining in the grooves, and dust collecting hoods for sucking and removing the fumes and the molten iron.

* * * * *